United States Patent [19]

Katayama et al.

[11] Patent Number: 4,958,238

[45] Date of Patent: Sep. 18, 1990

[54] IMAGE PROCESSING METHOD AND APPARATUS WITH CONDITIONAL CORRECTION OF ERROR DATA

[75] Inventors: Akihiro Katayama, Kawasaki; Hidefumi Ohsawa, Kawaguchi, both of Japan

[73] Assignee: Canon Kabushiki Kaisha, Tokyo, Japan

[21] Appl. No.: 319,057

[22] Filed: Mar. 6, 1989

[30] Foreign Application Priority Data

Mar. 8, 1988 [JP] Japan ................................. 63-054621

[51] Int. Cl.⁵ ............................................... H04N 1/40
[52] U.S. Cl. .................................... 358/456; 358/455; 358/454; 382/22
[58] Field of Search ............... 358/280, 283, 284, 282, 358/294, 453, 454, 455, 456, 457, 458, 459, 466; 382/27, 50, 22

[56] References Cited

U.S. PATENT DOCUMENTS

| | | | |
|---|---|---|---|
| 4,084,196 | 4/1978 | Tissue et al. | 358/280 |
| 4,575,768 | 3/1986 | Sakai et al. | 358/280 |
| 4,667,227 | 5/1987 | Ikeda | 358/75 |
| 4,667,250 | 5/1987 | Murai | 358/298 |
| 4,672,433 | 6/1987 | Yamamoto et al. | 358/75 |
| 4,731,862 | 3/1988 | Tsuda et al. | 358/282 |
| 4,748,677 | 5/1988 | Yokomizo | 358/282 |
| 4,751,585 | 6/1988 | Shibazaki | 358/282 |
| 4,827,351 | 5/1989 | Sakamoto | 358/284 |
| 4,876,610 | 10/1989 | Ohsawa et al. | 358/443 |
| 4,878,125 | 10/1989 | Katayama et al. | 358/443 |

OTHER PUBLICATIONS

"An Adaptive Algorithm for Spatial Gray Scale", in SID Digest, 1975, Floyd et al.

*Primary Examiner*—Howard W. Britton
*Assistant Examiner*—Kim Yen Vu
*Attorney, Agent, or Firm*—Fitzpatrick, Cella, Harper & Scinto

[57] ABSTRACT

There is provided an image processing apparatus which handles an image as a digital signal, comprising: an input device to input image data indicative of a concentration of an image; a binarization circuit to binarize the input image data; a positive/negative state detection circuit to detect whether error data generated when the image data is binarized by the binarization circuit is in a positive state or a negative state; and a selector to select whether the error data generated upon binarization is to be corrected or not, on the basis of the positive or negative state of the error data. The input device has a generator to read an original and generate an analog image signal and a converter to convert the analog image signal into the digital image data. The error data is the difference between the input image data and the binary data produced by the binarization circuit. With this apparatus, an image of a good picture quality can be obtained by improving the error diffusion method as a halftone processing method. Even when portions of high and low concentrations in an original are very close to each other, the blanking phenomenon, wherein no dot is printed in the low concentration area near the boundary between those portions, and the consequent problem that the reproduced image lacks its proper content can be prevented.

23 Claims, 10 Drawing Sheets

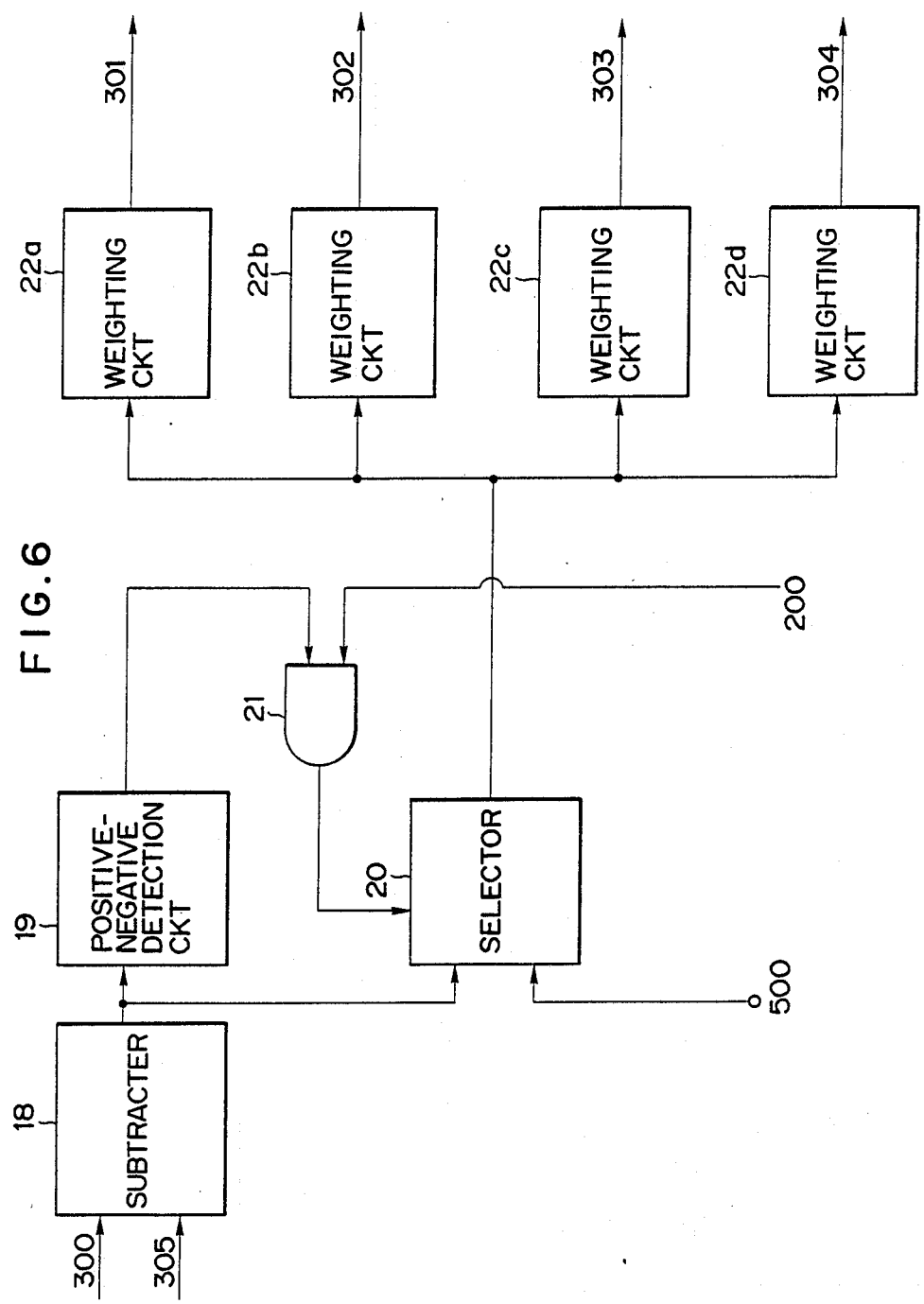
F I G. 6

IMAGE PROCESSING METHOD AND APPARATUS WITH CONDITIONAL CORRECTION OF ERROR DATA

BACKGROUND OF THE INVENTION

1. Field of the Invention

The present invention relates to an image processing apparatus such as may be encountered in a digital printer, a digital facsimile, or the like, which handles an image as a digital signal, and also to an image processing method which is used in such an image processing apparatus. More particularly, the invention relates to an image processing method and apparatus for halftone processing of image data.

2. Related Background Art

Hitherto, as a binarizing method of reproducing a halftone in a digital printer, a digital facsimile, or the like, there has been known an error diffusion method whereby errors generated by a binarizing process are distributed to peripheral pixels. Such a method has been proposed in the paper by Floyd and Steinberg, "An Adaptive Algorithm for Spatial Grayscale", SID DIGEST. in 1975.

On the other hand, there has also been known a method called the method of least mean error. Such the method is considered to be equivalent to the error diffusion method.

In the case of performing the binarizing process by using the error diffusion method, since there is no periodicity in the error process, no moire occurs for a dotted image, and the resolution is better than that in the case of a dither method (an example of another binarizing method) or the like. However, there is a drawback that a unique fringe pattern is generated in highlight portions of the image. To eliminate the drawback of the error diffusion method as mentioned above, the assignee of the present invention has 145,593, 192,601, and 203,880,and 284,603.

On the other hand, in the case of performing the binarizing process for a white portion such as a background of characters or the like by the error diffusion method, there is a drawback that dots appear in the white portion.

To prevent the appearance of dots, the U.S. patent application Ser. No. 289,017.

In the conventional error diffusion method, there is a drawback that in the case where an A area of high concentration of an original and a B area of low concentration of the original are neighboring, as shown in FIG. 12, a (blanking) phenomenon, wherein no dot is printed in the area (hatched portion in FIG. 12) near the boundary between the A and B areas and consequently a reproduced image lacks the content it should have being blank instead, so that the image quality is remarkably deteriorated.

SUMMARY OF THE INVENTION

It is an object of the present invention to eliminate the drawbacks of the conventional techniques mentioned above.

Another object of the invention is to provide an image processing method and apparatus in which an image of a high picture quality can be obtained by improving the error diffusion method as a halftone processing method.

Still another object of the invention is to provide an image processing method and apparatus in which it is possible to prevent the (blanking) phenomenon such that, in a case where the portion of a high concentration of an original and a portion of a low concentration of the original are neighboring, no dot is printed in the area of the low original concentration near the boundary between those portions.

According to one aspect of the invention is provided an image processing method and apparatus in which a state of error data which is generated when binarizing image data is discriminated and on the basis of the result of the discrimination, it is selected whether the error data is to be corrected or not.

According to another aspect of the invention is provided an image processing apparatus in which a selection is made as to whether error data which is generated when digitizing image data is corrected or not, in accordance with the state of the error data and whether the image data exists in an edge portion or not.

According to another aspect of the invention is provided an image processing apparatus in which, in the case of binarizing image data by the error diffusion method, negative errors are not distributed to the peripheral pixels in the edge portion of an image.

According to still another aspect of the invention is provided an image processing apparatus in which it can be selected whether error data which is generated by binarizing image data is to be corrected or not, with the result that an edge can be emphasized for an image such as characters, diagram, or the like.

The above and other objects and features of the present invention will become apparent from the following detailed description of the preferred embodiments, taken with reference to the accompanying drawings.

BRIEF DESCRIPTION OF THE DRAWINGS

FIG. 6 is a block arrangement diagram showing the details of an error distribution control circuit 17;

FIG. 1 is modified;

DETAILED DESCRIPTION OF PREFERRED EMBODIMENTS

An embodiment of the present invention will be described hereinbelow with reference to the drawings.

Figure 1:
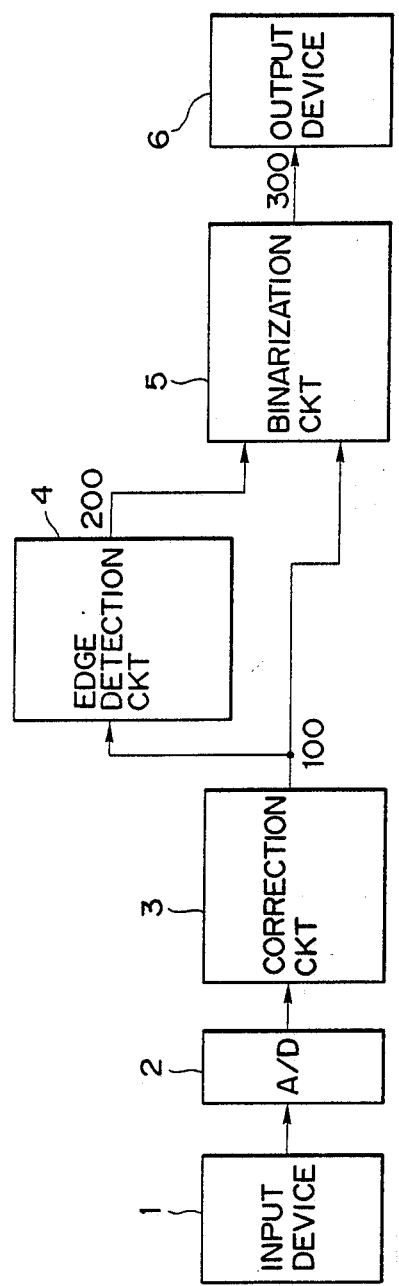
FIG. 1 is a block arrangement diagram of an embodiment of the present invention.

FIG. 1 is a block arrangement diagram of an image processing apparatus of the embodiment.

Image data which was read by an input device 1 having a photoelectric converting device such as a CCD or the like and a driving system to scan it is sequentially sent to an A/D converter 2. In this case, for instance, data for each pixel is converted into digital data for eight bits. Thus, the data is digitized into data having gradations of 256 levels. Next, in a correction circuit 3, the corrections such as shading correction and the like to correct sensitivity variation of a sensor and illuminance variation due to an illuminating light source are executed by digital arithmetic operating processes. Then, a corrected signal 100 is input to an edge detection circuit 4 and a binarization circuit 5. In the edge detection circuit 4, a check is made to see if an edge exists between an objective pixel (i.e., the pixel of interest) and its peripheral pixels or not. The result of the discrimination is output as a signal 200. In the binarization circuit 5, the sum of the total of errors which are distributed to the objective pixel and the signal 100 (concentration data of the objective pixel) is binarized on the basis of a threshold value T and a binary output singal 300 is output. On the other hand, the binarization circuit 5 also discriminates whether the errors generated upon binarization have a positive value or a negative value, thereby determining amounts of errors which are distributed to the peripheral pixels on the basis of the signal 200 indicative of the presence or absence of the edge and the result of the discrimination of the positive/negative value of the errors. An output device 6 comprises a laser beam printer, an ink jet printer, or the like and forms an image by the on/off (production/non-production) of dots on an output medium on the basis of the binary output signal 300 output from the binarization circuit 5.

Figure 2:
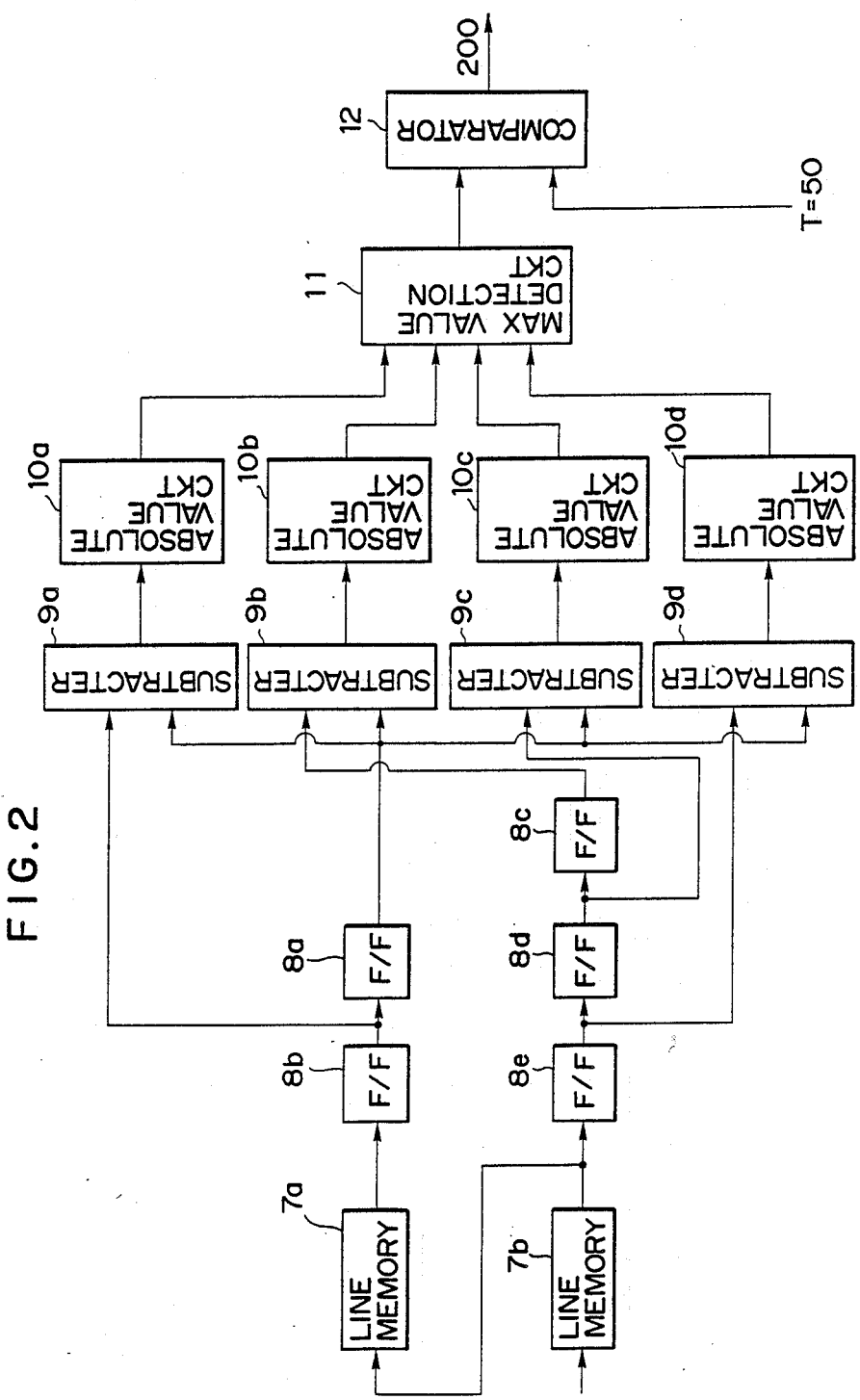
FIG. 2 is a block arrangement diagram showing the details of an edge detection circuit 4.

FIG. 2 is a block diagram showing the details of the edge detection circuit 4.

Figure 3:
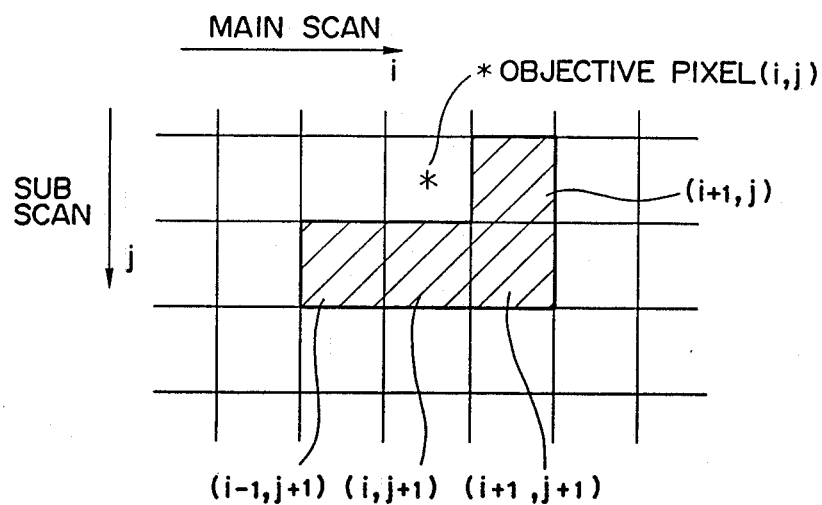
FIGS. 3 and 4 are diagrams showing the positional relation between an objective pixel and another pixel for use to perform the edge discrimination.

Reference numerals 7a and 7b denote line memories each for delaying the 8-bit data sent from the correction circuit 3 by one line; 8a to 8e indicate flip-flops each for delaying the data by one pixel; 9a to 9d subtracters; 10a to 10d absolute value circuits each for obtaining the absolute value; 11 a maximum value detection circuit to output the maximum value of the input signals; and 12 a comparator to compare an input signal with the threshold value T (e.g., T=50). The values corresponding to the pixel positions (i, j), (i+1, j), (i−1, j+1), (i, j+1), and (i+1, j+1) in FIG. 3 are latched into the flip-flops 8a to 8e, respectively. The pixel position (i, j) indicates the objective pixel which is at present being processed. The subtracter 9a calculates the difference between the concentrations at the pixel positions (i, j) and (i+1, j), and the absolute value circuit 10a calculates its absolute value. In a manner similar to the above, the subtracters 9b, 9c, and 9d calculate the differences between the concentrations at the pixel positions of (i, j) and (i−1, j+1), (i, j) and (i, j 1), and (i, j) and (i+1, j+1), respectively. The absolute value circuits 10b to 10d calculate their absolute values, respectively. The absolute values output from the absolute value circuits 10a to 10d are input to the maximum value detection circuit 11, by which the maximum value is detected from among the input signals and is output. The comparator 12 compares the output singal of the maximum value detection circuit 11 with the threshold value T (T =50). When the input signal is larger than the threshold value T, it is determined that an edge exists. so that a "1" signal is output as the signal 200. On the contrary, when the input signal is smaller than the threshold value T, it is decided that no edge exists, so that a "0" signal is output as the signal 200.

By executing these processes performed by the foregoing construction, edges between the objective pixel and the peripheral pixels can be detected.

Figure 4:
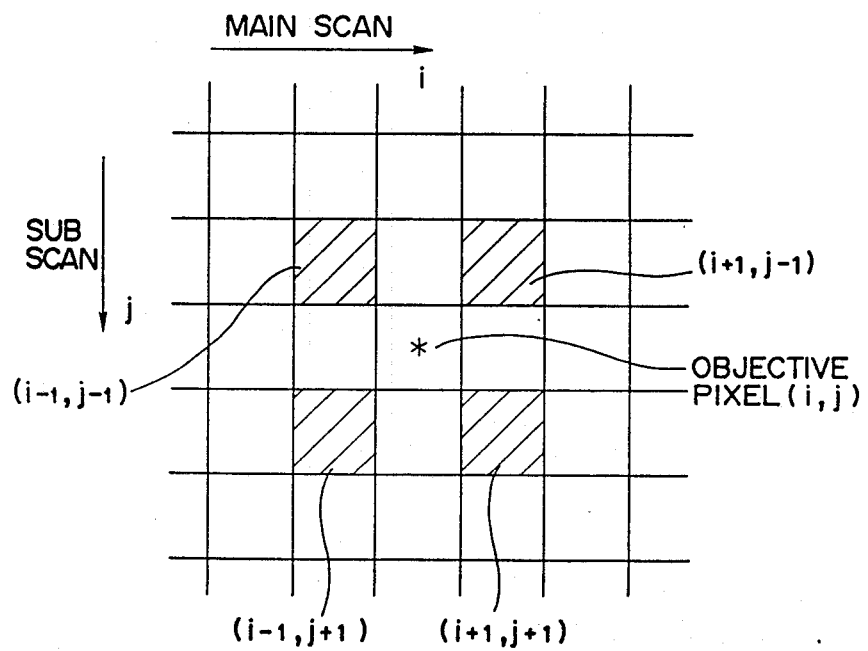

As will be explained in detail hereinbelow, since the errors of the (i, j) pixel caused by the binarization are distributed to the peripheral (i+1, j), (i−1, j+1), (i, j+1), and (i+1, j+1) pixels, the edges of the objective pixel and peripheral pixels are detected so as to correspond to those pixels. However, as shown in FIG. 4, it is also possible to detect an edge by calculating the differences between the (i, j) objective pixel and the peripheral (i−1, j−1), (i+1, j−1), (i−1, j+1), and (i+1, j+1) pixels, respectively. On the other hand, the invention is not limited to the above constructions, but it is possible to use any construction which can detect an edge.

Figure 5:
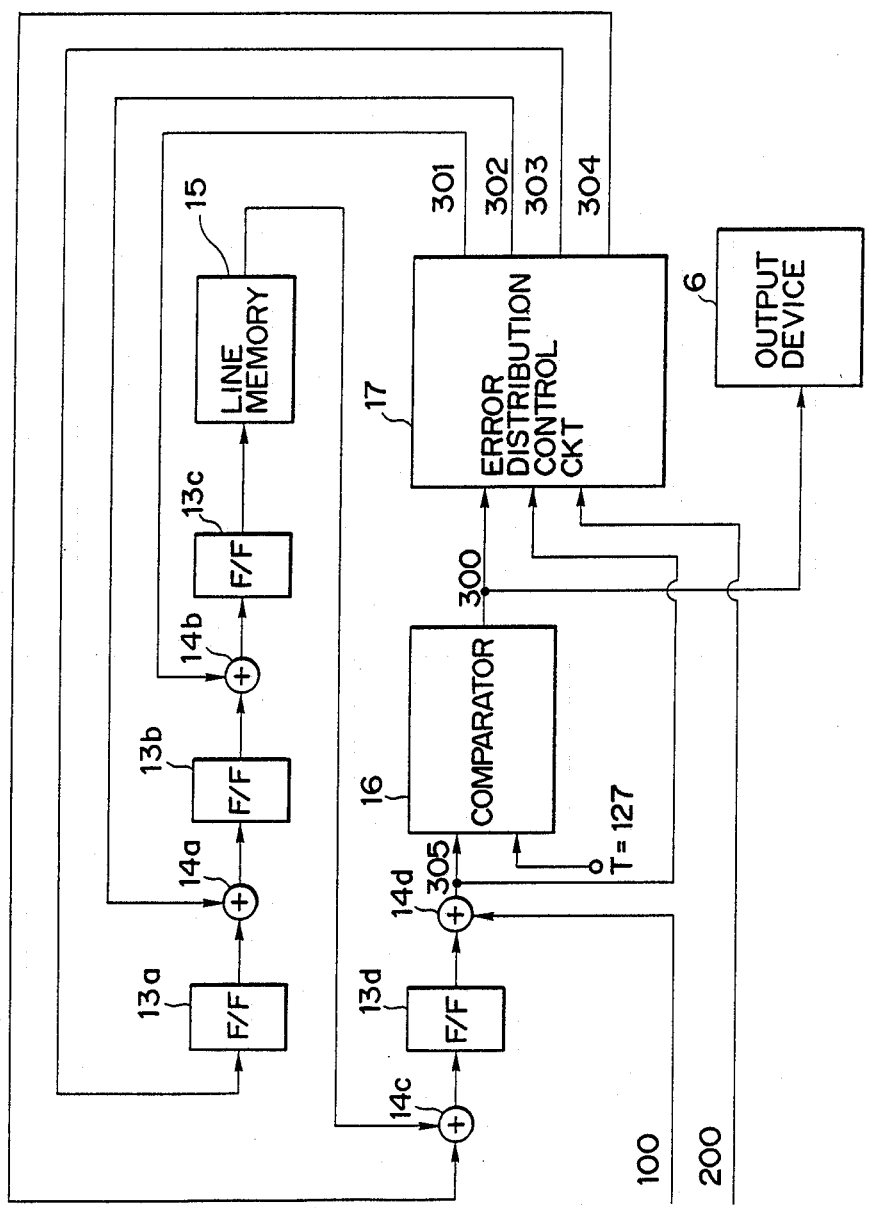
FIG. 5 is a block arrangement diagram showing the details of a binarization circuit 5.

FIG. 5 is a block diagram of the binarization circuit 5.

Reference numerals 13a to 13d denote flip-flops each for delaying the error data by one pixel; 14a to 14d indicate adders; 15 a line memory to delay the error data by one line; 16 a comparator; and 17 an error distribution control circuit.

First, the corrected signal 100 (original image data corresponding to the pixel position (i, j)) from the correction circuit 3 is added to the total of errors which are distributed to the pixel position (i, j) by the adder 14d. An added value 305 is binarized by the comparator 16 on the basis of the threshold value T (T =127). The result of the binarization is output as signal 300 and is input to the error distribution control circuit 17 and output device 6. The error distribution control circuit 17 calculates the difference (error) (error =signal 305 - signal 300) between the sum signal 305 (error corrected data to which the errors corresponding to the pixel position (i, j) have been added) and the binary signal 300 (output data). Error amounts 301 to 304 which are distributed to the peripheral pixels are controlled by the positive/negative value of the errors and the signal 200 indicative of the presence or absence of the edge. The error amounts 301 to 304 are added to the error amounts which have already been distributed to the pixel positions (i−1, j+1), (i, j+1), (i+1, j+1), and (i+1, j), respectively. The (i, j) pixel corresponds to the objective pixel. On the other hand, although the number of pixels to which the errors are distributed has been set to the above-identified four pixels around the objective pixel, it can be also set to twelve peripheral pixels or an other number of pixels.

FIG. 6 is a block diagram showing the details of the error distribution control circuit 17. Reference numeral 18 denotes a subtracter; 19 indicates a positive-negative detection circuit to discriminate whether the input signal has a positive value or a negative value; 20 a selector; 21 an AND circuit; and 22a to 22d weighting circuits. The subtracter 18 calculates the difference between the binary data 300 and the data 305 before binarization and inputs the result to the positive-negative detection circuit 19 and selector 20. If the input data has a positive value, the detection circuit 19 outputs a "0" signal. If the input data has a negative value, the detection circuit 19 outputs a "1" signal. The AND circuit 21 gets the AND of the signal from the detection circuit 19 and the signal 200. The result is output to the selector 20. When a signal from the AND circuit 21 is set to "1", that is, in the case where the error data has a negative value and the presence of an edge is detected, the selector 20 outputs a signal 500 (=0) to the weighting circuits 22a to 22d. On the contrary, when the signal from the AND circuit 21 is set to "0", that is, if the error data has a positive value or it is determined that no edge is present, the selector 20 outputs the signal output from the subtracter 18 to the weighting circuits 22a to 22d. The weighting circuits 22a to 22d weight the output signal from the selector 20 and output the resultant weighted values (signals 301 to 304), respectively. In the example, weighting coefficients of the weighting circuits 22a and 22c have been set to 1/6 and weighting coefficients 22b and 22d of the weighting circuits have been set to $\frac{1}{3}$. However, the invention is not limited to those values but the weighting coefficients can be also set to arbitrary values.

By distributing none of the negative error amount in the edge portion to the peripheral pixels as mentioned above, the negative errors are added in the portion of a low concentration around the edge portion. Therefore, the concentration of the objective pixel is smaller than the threshold value and no dot appears and the (blanking) phenomenon, wherein the image lacks what should be present there, can be prevented.

Other Embodiment 1

Figure 7:
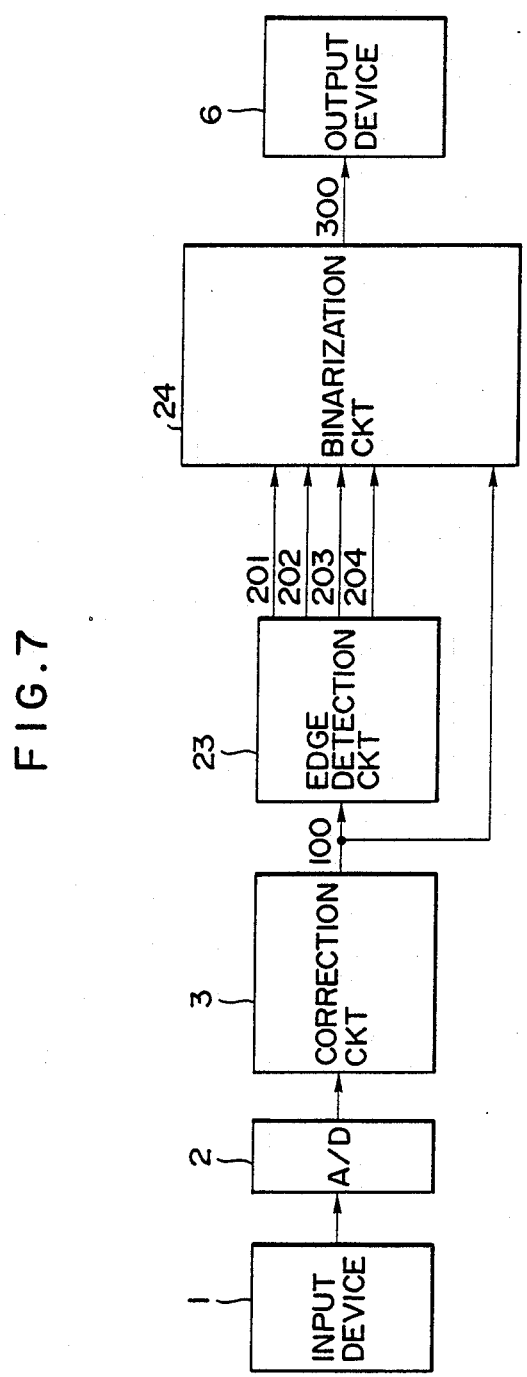
FIG. 7 is a block arrangement diagram showing the case where a part of the embodiment

FIG. 7 is a block diagram showing a case where parts of the edge detection circuit 4 and binarization circuit 5 in the embodiment of FIG. 1 are modified. The input device 1, A/D converter 2, correction circuit 3, and output device 6 are the same as those shown in FIG. 1, and their descriptions are omitted.

The corrected signal 100 is input to an edge detection circuit 23 and a binarization circuit 24. The edge detection circuit 23 detects whether an edge exists or not between the objective pixel (i, j) and the pixel position (i+1, j), between the objective pixel (i, j) and the pixel position (i−1, j+1), between the objective pixel (i, j) and the pixel position (i, j+1), and between the objective pixel (i, j) and the pixel position (i+1, j+1) and outputs the results as signals 201 to 204, respectively. The binarization circuit 24 binarizes the sum of the total of errors which are distributed to the objective pixel and the signal 100 (concentration data of the objective pixel) on the basis of the threshold value T and outputs the binary output singal 300. In addition, the binarization circuit 24 also discriminates whether the errors generated upon binarization have a positive value or a negative value, and thereby determines the amounts of errors which are distributed to the peripheral pixels on the basis of the signals 201 to 204 and the result of the positive/negative discrimination.

Figure 8:
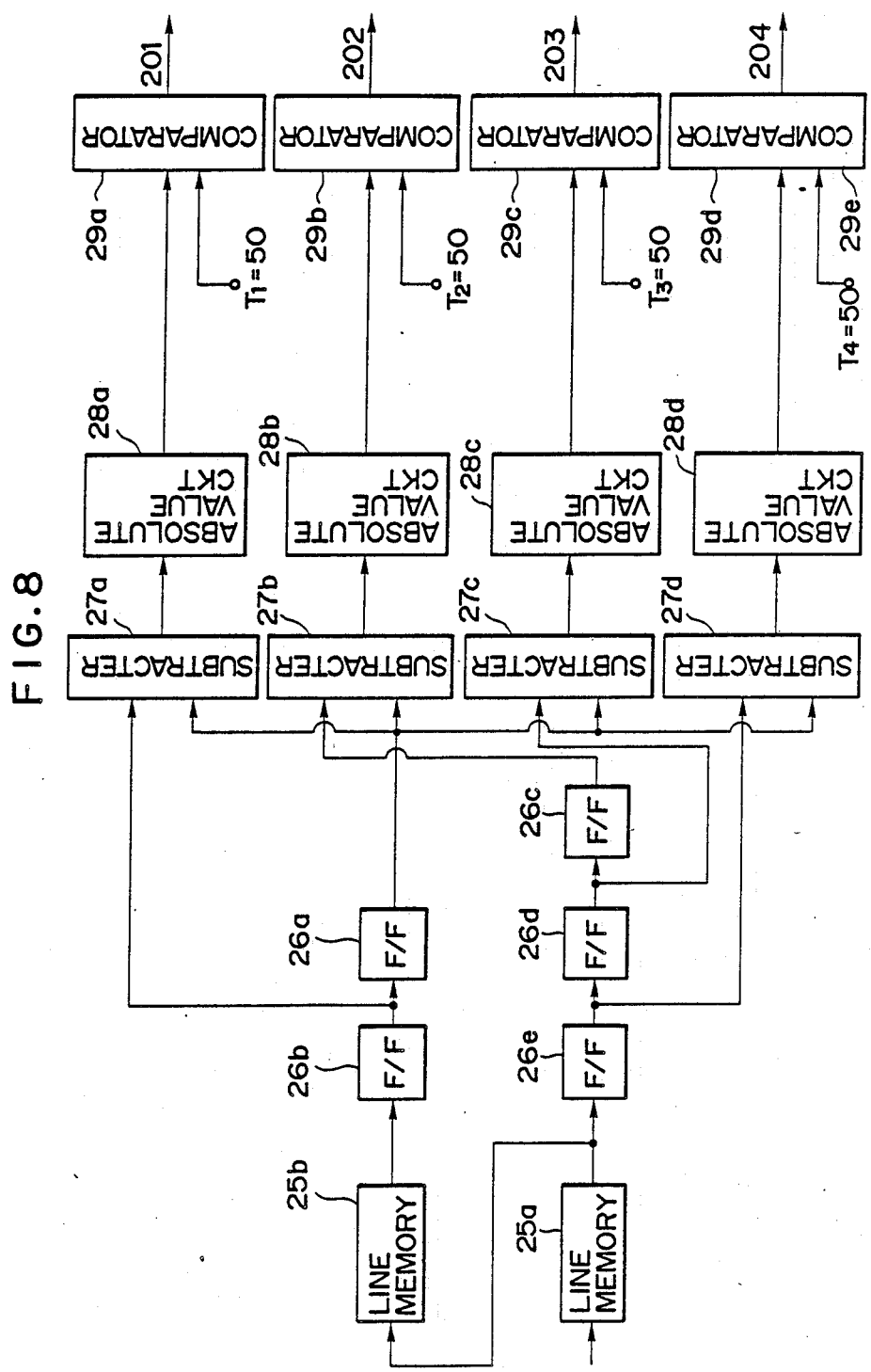
FIG. 8 is a block arrangement diagram showing the details of an edge detection circuit 23.

FIG. 8 is a block diagram of the edge detection circuit 23.

Reference numerals 25a and 25b denote line memories each for delaying data by one line; 26a to 26e indicate flip-flops; 27a to 27d subtracters; 28a to 28d absolute value circuits each for obtaining the absolute value; and 29a to 29d comparators each for comparing the input signal with the threshold value T (e.g., T=50). The values corresponding to the pixel positions (i, j), (i+1, j), (i−1, j+1), (i, j+1), and (i+1, j+1) in FIG. 3 are latched into the flip-flops 26a to 26e, respectively. The pixel position (i, j) represents the objective pixel which is at present being processed. The subtracter 27a calculates the difference between the concentrations at the pixel positions (i, j) and (i+1, j). The absolute value circuit 28a calculates its absolute value. Similarly, the subtracters 27b, 27c, and 27d calculate the differences between the concentrations at the pixel positions (i, j) and (i−1, j+1), (i, j) and (i, j+1), and (i, j) and (i+1, j+1), respectively. The absolute value circuits 28b to 28d calculate their absolute values, respectively. The output values from the absolute value circuits 28a to 28d are input to the comparators 29a to 29d and compared with threshold values T ($T_1$ to $T_4$), respectively. When the input signal is larger than the threshold values T, it is determined that an edge exists, so that a "1" signal is output as the signals 201 to 204. If the input signal is smaller than the threshold values T, the absence of an edge is decided, so that a "0" signal is output as the signals 201 to 204, respectively. With this construction, the edge detection can be executed on a pixel unit basis.

Due to this, in the comparison with the objective pixel (i, j), since the negative errors are not diffused for the pixel in which the edge was detected, the edge emphasis can be executed.

On the other hand, in the comparison with the objective pixel (i, j), since the errors are diffused in any of the cases of the positive and negative errors for the pixel in which no edge is detected, the execution of the edge emphasis for that pixel can be prevented. That is, according to this embodiment, the presence or absence of an edge is detected for every pixel, and it is discriminated whether the negative errors are distributed or not on the basis of the result of the edge detection. Therefore, even if an edge image such as characters, a diagram, or the like and a halftone image mixedly exist, optimum processing can be executed for each image.

Figure 9:
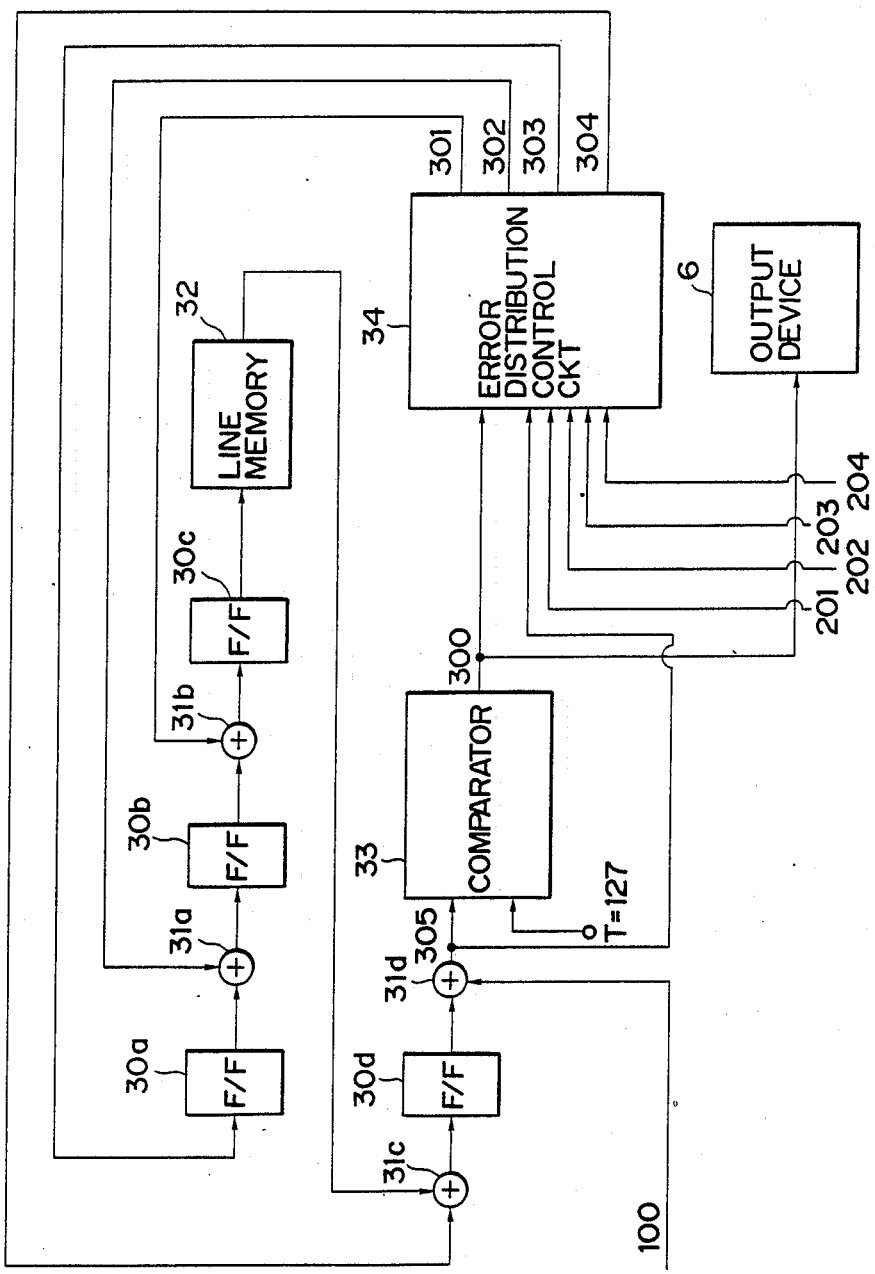
FIG. 9 is a block arrangement diagram showing the details of a binarization circuit 24.

FIG. 9 is a block diagram of the binarization circuit 24 in FIG. 7.

Reference numerals 30a to 30d denote flip-flops; 31a to 31d indicate adders; 32 a line memory to delay data by one line; 33 a comparator; and 34 an error distribution control circuit.

Figure 11:
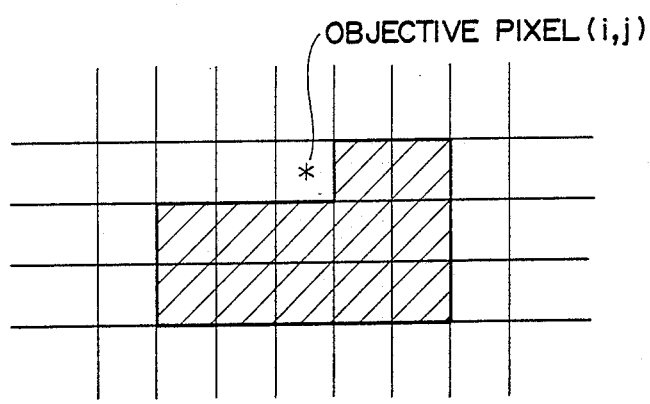
FIG. 11 is a diagram showing an example of the positional relation between an objective pixel and pixels for distribution of errors upon binarization.
Figure 12:
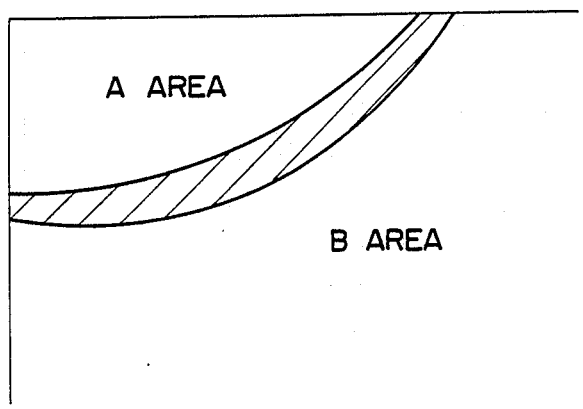
FIG. 12 is a diagram for explaining a problem of a conventional apparatus.

First, the corrected signal 100 (original image data corresponding to the pixel position (i, j)) sent from the correction circuit 3 is added to the sum of errors which are distributed to the pixel position (i, j) by the adder 31d. The added value is binarized by the comparator 33 on the basis of the threshold value T. The result of the binarization is output as the signal 300 and is input to the error distribution control circuit 34 and output device 6. The error distribution control circuit 34 calculates the difference (error) between the sum signal 305 (error corrected data to which the errors corresponding to the pixel position (i, j) were added) and the binary signal 300 (output data), thereby controlling the error amounts 301 to 304 which are distributed to the peripheral pixels on the basis of the positive/negative errors and the edge signals 201 to 204, respectively. The error amounts 301 to 304 are added to the error amounts which have already been distributed to the pixel positions (i−1, j+1), (i, j+1), (i+1, j+1), and (i+1, j), respectively. The (i, j) pixel corresponds to the objective pixel. On the other hand, although the number of pixels to which the errors are distributed has been set to four pixels around the objective pixel, the invention is not limited to only four pixels. For instance, the errors can be also distributed to twelve pixels (hatched portions in FIG. 11) around the objective pixel.

Figure 10:
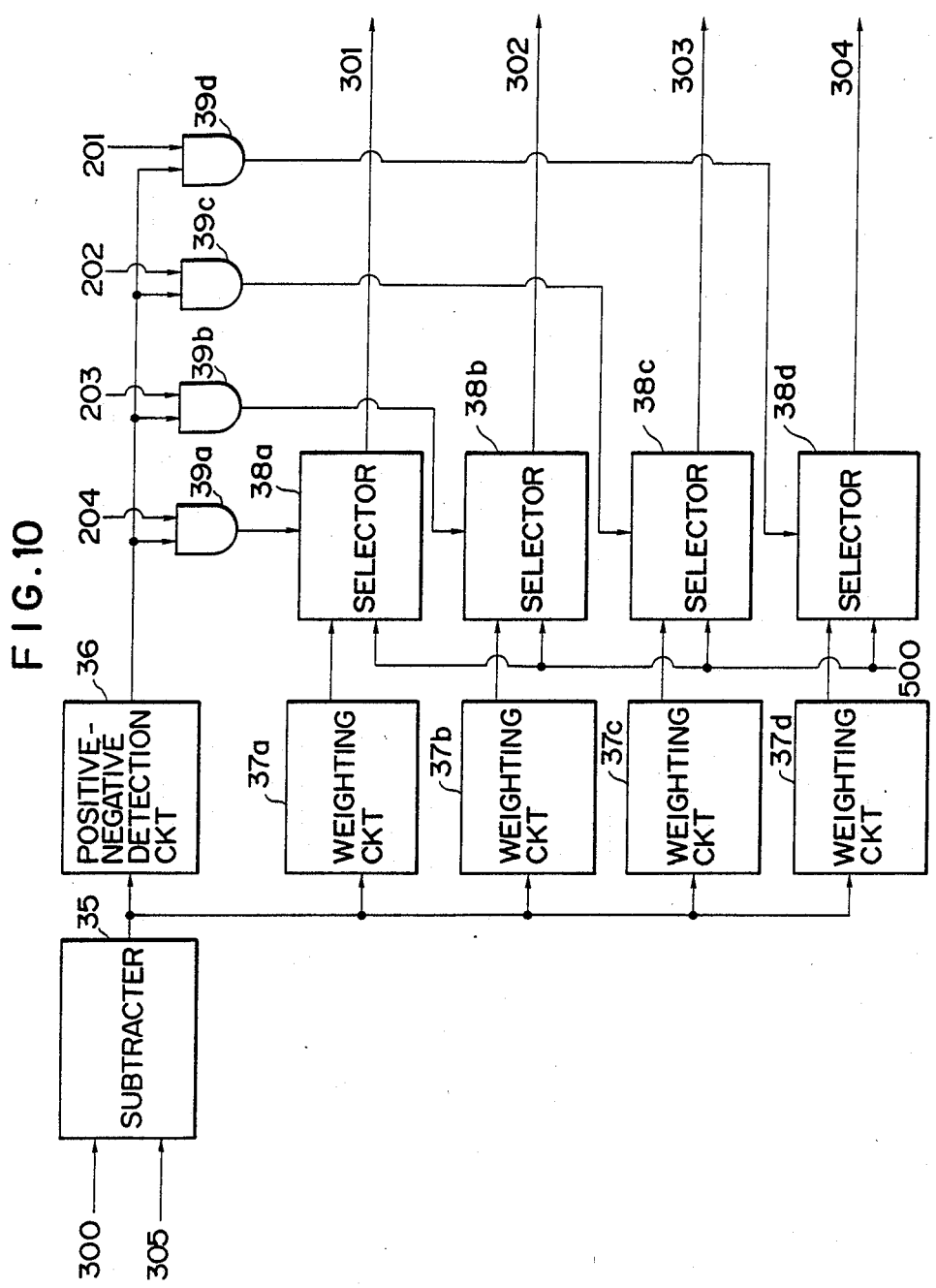
FIG. 10 is a block arrangement diagram showing the details of an error distribution control circuit 34.

FIG. 10 is a block diagram of the error distribution control circuit 34. Reference numeral 35 denotes a subtracter; 36 is a positive-negative detection circuit to discriminate whether the input signal has a positive value or a negative value; 37a to 37d weighting circuits;

38a to 38d selectors; and 39a to 39d AND circuits. The subtracter 35 calculates the difference between the binary data 300 and the data 305 before the binarization. The result is input to the positive-negative detection circuit 36 and weighting circuits 37a to 37d. If the input data has a positive value, the detection circuit 36 outputs a "0" signal. If the input data has a negative valve, the detection circuit 36 outputs a "1" signal. AND circuits 39a to 39d get the ANDs of the signal from the positive-negative detection circuit 36 and the signals 201 to 204, respectively. The results are output to the selectors 38a to 38d. The selector 38a outputs the signal 500 (=0) when the signal from the AND circuit 39a is set to "1", that is, in the case where the error data has a negative value and the presence of the edge is detected On the contrary, when the signal from the AND circuit 39 is set to "0", namely, in the case where the error data has a positive value or it is detected that no edge exists, the selector 38a outputs the signal from the weighting circuit 37a as the signal 301. Similarly, when the signal from the AND circuit 39b is set to "1", the selector 38b outputs the signal 500 (=0). When the signal from the AND circuit 39b is set to "0", the selector 38b outputs the signal from the weighting circuit 37b as the signal 302. On the other hand, when the signal from the AND circuit 39c is set to "1", the selector 38c outputs the signal 500 (=0). When the signal from the AND circuit 39c is set to "0", the selector 38c outputs the signal from the weighting circuit 37c as the signal 303. When the signal from the AND circuit 39d is set to "1", the selector 38d outputs the signal 500 (=0). When the signal from the AND circuit 39d is set to "0", the selector 38d outputs the signal from the weighting circuit 37d as the signal 304. In the embodiment, the weighting coefficients of the weighting circuits 37a and 37c have been set to 1/6 and the weighting coefficients of the weighting circuits 37b and 37d have been set to ⅓. However, the invention is not limited to these values. Their weighting coefficients may be set to arbitrary values.

In the foregoing construction, by distributing none of the negative error amounts to the peripheral pixels in the edge portion, the phenomenon of the lack of image which occured in the portion of a low concentration in the edge portion can be prevented. This is because, since the negative error amount is not distributed to pixels of a low concentration, the reduction of the concentration of the pixel having a low concentration is eliminated. On the other hand, with the foregoing construction, it is possible to discriminate whether an edge exists or not between the objective pixel and each of the pixels to which the errors are distributed. Thus, since a situation such that the negative errors are cut in the edgeless portion (that is, only the positive errors are added) is eliminated, excessive edge emphasis in the edgeless portion can be prevented.

Other Embodiment 2

The embodiment can be also applied to the N-value process to express the input data by N values by the error diffusion method (N is an integer of 2 or more). In such a case, it is sufficient to merely use an LUT in place of the comparator 16 in FIG. 5 or the comparator 33 in FIG. 9. For instance, when N=3, it is preferable to provide an LUT such that when the input data is 80 or less, "0" is output as the signal 300, when the input data lies within a range from 81 to 170, "127" is output as the signal 300, and when the input data is 171 or more, "255" is output as the signal 300. In this case, it is assumed that the input data consists of eight bits.

On the other hand, the embodiment can be also applied to the N-value process of a color image (N is an integer equal to 2 or more). In such a case, the invention can be realized by providing the circuits of the embodiment as many as a predetermined colors.

As described above, according to the invention, it is possible to prevent the (blanking) phenomenon which occurs when image data is digitized by the error diffusion method and in which in the case where the portion having a high concentration of an original and the portion having a low concentration of the original are neighboring, no dot is printed in an area of low original concentration near the boundary between those portions and the reproduction image is lacking in that region.

Although the present invention has been described with respect to its preferred embodiments, the invention is not limited to the foregoing embodiments but many modifications and variations are possible within the spirit and scope of the appended claims of the invention.

What is claimed is:

1. An image processing apparatus comprising:
   input means for inputting image data indicative of a concentration of an image;
   binarizing means for binarizing the image data input by said input means;
   correction means for correcting error data generated when the image data is binarized by said binarizing means;
   control means for controlling whether or not correction of the error data is to be performed by said correction means; and
   state detecting means for detecting a state of the error data,
   wherein said control means controls said correction means, in accordance with a detection result obtained by said state detecting means, such that said correction means performs correction of the error data in a portion other than an edge portion of the image and does not perform correction of the error data in the edge portion of the image.

2. An apparatus according to claim 1, wherein said input means has means for reading an original and generating an analog image signal and means for converting the analog image signal into digital image data.

3. An apparatus according to claim 1, wherein the error data whose state is detected by said state detecting means is the difference between the image data input by said input means and the binary data binarized by said binarizing means.

4. An apparatus according to claim 1, wherein said state detecting means detects whether the error data is in a positive state or a negative state.

5. An apparatus according to claim 4, wherein said control means controls said correction means such that said correction means corrects the error data when the error data is positive and does not correct the error data when the error data is negative.

6. An apparatus according to claim 4, further having edge discriminating means for discriminating whether the image data input by said input means exists in an edge portion of the image or not.

7. An apparatus according to claim 1, further having output means for forming and outputting an image on the basis of the data binarized by said binarizing means.

8. An image processing apparatus, comprising:

input means for inputting image data indicative of a concentration of an image;

binarizing means for binarizing the image data input by said input means;

state detecting means for detecting a state of error data which is generated when the image data is binarized by said binarizing means; and selecting means for selecting whether the error data generated when the image data is binarized by the binarizing means is corrected or not on the basis of the result of the detection of said state detecting means; and edge discriminating means for discriminating whether the image data input by said input means exists in an edge portion of the image or not, wherein said selecting means selects that the error data is not corrected when said edge discriminating means discriminates that the image data exists in the edge portion and said state detecting means detects that the error data is in a negative state.

9. An image processing apparatus, comprising:

input means for inputting image data indicative of an image;

digitizing means for binarizing the image data;

state detecting means for detecting a state of error data which is generated when said image data is binarized;

edge detecting means for detecting an edge in the image from the image data; and selecting means for selecting whether the error data generated when the image data is binarized is to be corrected or not, in accordance with the result of the state detection by said state detecting means and with an output from said edge detecting means, wherein said state detecting means detects whether the difference between the image data input by said input means and the data binarized by said digitizing means is in a positive state or a negative state, and wherein said selecting means selects that the error data is not corrected when said edge detecting means outputs a signal indicating that the image data exists in the edge portion and said state detecting means detects that the error data is in the negative state.

10. An apparatus according to claim 9, further having means for forming and outputting an image on the basis of the binary data binarized by said digitizing means.

11. An image processing apparatus, comprising:

input means for inputting image data indicative of an image;

digitizing means for digitizing the image data;

state detecting means for detecting a state of error data which is generated when said image data is digitized;

edge detecting means for detecting an edge in the image from the image data; and selecting means for selecting whether the error data is to be corrected or not, in accordance with the result of the state detection by said state detecting means and with an output from said edge detecting means, wherein said selecting means selects that the error data is corrected in the case where said edge detecting means outputs a signal indicating that the image data does not exist in the edge portion.

12. An image processing apparatus comprising:

input means for inputting image data of an objective pixel;

binarizing means for binarizing the image data of the objective pixel;

edge detecting means for detecting the presence or absence of an edge with respect to each pixel from the image data of the objective pixel and from a plurality of image data around the objective pixel; and correcting means for correcting error data which is generated when the image data is binarized on the basis of the result of the edge detection of said edge detecting means, wherein said correcting means corrects the error data for the pixel in which no edge is detected in accordance with the presence or absence of the edge for every pixel which is edge detected by said edge detected means.

13. An apparatus according to claim 12, wherein said input means has means for reading an original and for generating an analog image signal and means for converting said analog image signal into the digital image data.

14. An apparatus according to claim 12, further having state detecting means for detecting whether the error data is in a positive state or a negative state.

15. An apparatus according to claim 14, wherein said correcting means does not distribute the negative error data generated when the image data of the objective pixel has been binarized for the pixel in which the edge has been detected by said edge detecting means.

16. An image processing method comprising the steps of:

inputting image data indicative of a concentration of an image;

binarizing the image data input in said inputting step;

controlling whether or not correction of the error data is to be performed;

correcting error data generated when the image data is binarized in said binarizing step; and detecting a state of the error data, wherein, in said controlling step, performance of said correcting step is controlled in accordance with a detection result obtained in said state detecting step, such that in said correcting step, correction of the error data is performed in a portion other than an edge portion of the image and is not performed in the edge portion of the image.

17. A method according to claim 16, wherein said inputting step further comprises reading an original and generating an analog image signal, and converting the analog image signal into digital image data.

18. A method according to claim 16, wherein the error data whose state is detected in said state detecting step is the difference between the image data input in said inputting step and the binary data binarized in said binarizing step.

19. A method according to claim 16, wherein in said state detecting step, a check is made to see if the error data is in a positive state or a negative state.

20. A method according to claim 19, wherein, in said correcting step, the error data is corrected when the error data is, and the error data is not corrected when the error data is negative.

21. A method according to claim 16, further having an edge discriminating step of discriminating whether the image data input by said inputting step exists in an edge portion of the image or not.

22. A method according to claim 16, further comprising the step of forming and outputting an image on the basis of the data binarized in said binarizing step.

23. An image processing method, comprising the steps of:

inputting image data indicative of a concentration of an image;

binarizing the image data input in said inputting step;

detecting a state of error data which is generated when the image data is binarized in said binarizing step;

selecting whether the error data generated when the image data is binarized is to be corrected or not, on the basis of the result of said state detecting step; and discriminating whether the image data input in said inputting step exists in an edge portion of the image or not, wherein, in said selecting step, it is selected that the error data is not corrected when it is discriminated in said edge discriminating step that the image data exists in the edge portion and it is detected by said state detecting step that the error data is in the negative state.

* * * * *

UNITED STATES PATENT AND TRADEMARK OFFICE
CERTIFICATE OF CORRECTION

PATENT NO. : 4,958,238
DATED : September 18, 1990
INVENTOR(S) : AKIHIRO KATAYAMA, ET AL.

Page 1 of 3

It is certified that error appears in the above-identified patent and that said Letters Patent is hereby corrected as shown below:

On the title page:

IN [56] REFERENCES CITED

U.S. PATENT DOCUMENTS, "Tissue et al." should read --Tisue et al.--.

COLUMN 1

Line 24, "GEST." should read --GEST,--.
Line 26, "the" (second occurrence) should be deleted.
Line 38, "has 145,593," should read --has already proposed various new developments, disclosed in U.S. Patents 4,876,610 and 4,878,125 and in U.S. patent applications Serial Nos. 145,393,-- and "and" should be deleted.
Line 45, "the U.S. patent" should read --the assignee of the present invention has already proposed one solution, disclosed in U.S. patent--.
Line 48, "that" should read --that,--.
Line 53, "consequently" should read --consequently,--.
Line 54, "have" should read --have,--.

COLUMN 2

Line 2, "a case where the" should read --the case where a--.
Line 49, "FIG. 1" should read --of FIG. 1--.
Line 62, "PREFERRED" should read --THE PREFERRED--.

UNITED STATES PATENT AND TRADEMARK OFFICE
CERTIFICATE OF CORRECTION

PATENT NO. : 4,958,238

DATED : September 18, 1990

INVENTOR(S) : AKIHIRO KATAYAMA, ET AL.

It is certified that error appears in the above-identified patent and that said Letters Patent is hereby corrected as shown below:

COLUMN 3

Line 6, "for" should read --of--.
Line 22, "singal 300" should read --signal 300--.
Line 56, "(i, j 1)," should read --(i, j + 1),--.
Line 63, "singal" should read --signal--.

COLUMN 4

Line 49, "an" should read --an- --.

COLUMN 5

Line 45, "singal 300." should read --signal 300.--.

COLUMN 7

Line 7, "valve," should read --value,--.
Line 15, "detected" should read --detected.--.

COLUMN 8

Line 7, "a" should read --the--.
Line 16, "reproduction" should read --reproduced--.

COLUMN 10

Line 65, "is," should read --is positive,--.

UNITED STATES PATENT AND TRADEMARK OFFICE
CERTIFICATE OF CORRECTION

PATENT NO. : 4,958,238

DATED : September 18, 1990

INVENTOR(S) : AKIHIRO KATAYAMA, ET AL.    Page 3 of 3

It is certified that error appears in the above-identified patent and that said Letters Patent is hereby corrected as shown below:

COLUMN 12

Line 12, "the" (second occurrence) should read --a--.

Signed and Sealed this

Seventh Day of July, 1992

Attest:

DOUGLAS B. COMER

Attesting Officer    Acting Commissioner of Patents and Trademarks